(12) United States Patent
Brinkmann et al.

(10) Patent No.: US 9,535,878 B1
(45) Date of Patent: *Jan. 3, 2017

(54) DRIVING EVENT DATA ANALYSIS

(71) Applicant: Allstate Insurance Company, Northbrook, IL (US)

(72) Inventors: Margaret A. Brinkmann, Palo Alto, CA (US); Daniel Kraft, Libertyville, IL (US); Nathan M. Bryer, Arlington Heights, IL (US); Eric Huls, Chicago, IL (US); Thomas Michael Warden, Belmont, CA (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/770,634

(22) Filed: Feb. 19, 2013

Related U.S. Application Data

(60) Provisional application No. 61/739,456, filed on Dec. 19, 2012.

(51) Int. Cl.
*G06F 17/00* (2006.01)

(52) U.S. Cl.
CPC ..................... *G06F 17/00* (2013.01)

(58) Field of Classification Search
CPC ........ G06Q 40/02; G06Q 40/08; G06Q 10/10; G06Q 30/0283; G07C 5/008
See application file for complete search history.

(56) References Cited

U.S. PATENT DOCUMENTS

| 5,131,848 | A  | * | 7/1992  | Adams ........................... 434/69 |
| 5,797,134 | A  | * | 8/1998  | McMillan et al. ............ 705/400 |
| 5,978,729 | A  |   | 11/1999 | Landes et al. |
| 6,037,860 | A  | * | 3/2000  | Zander et al. ................ 340/436 |
| 7,659,827 | B2 | * | 2/2010  | Gunderson et al. .......... 340/576 |
| 8,085,166 | B2 |   | 12/2011 | Tamir et al. |
| 8,086,523 | B1 |   | 12/2011 | Palmer |
| 8,140,359 | B2 |   | 3/2012  | Daniel |
| 2002/0111725 | A1 |  | 8/2002  | Burge |

(Continued)

FOREIGN PATENT DOCUMENTS

| WO | 2001018531 A1 | 3/2001 |
| WO | 2011057217 A2 | 5/2011 |
| WO | 2011128873 A2 | 10/2011 |

OTHER PUBLICATIONS

Rob Schneider, "Insurance Underwriting and Credit Scores", Consumer Union, Jan. 2003.

(Continued)

*Primary Examiner* — John R Olszewski
*Assistant Examiner* — Nicholas K Wiltey
(74) *Attorney, Agent, or Firm* — Banner & Witcoff, Ltd.

(57) ABSTRACT

A driving analysis server may be configured to receive vehicle operation data from vehicle sensors, and may use the data to identify a potentially high-risk or unsafe driving event by the vehicle. The driving analysis server also may receive corresponding image data, video, or object proximity data from the vehicle or one or more other data sources, and may use the image, video, or proximity data to analyze the potentially high-risk or unsafe driving event. A driver score for the vehicle or driver may be calculated or adjusted based on the analysis of the data and the determination of one or more causes of the driving event.

20 Claims, 5 Drawing Sheets

(56) References Cited

U.S. PATENT DOCUMENTS

| | | | |
|---|---|---|---|
| 2003/0191568 A1* | 10/2003 | Breed | 701/36 |
| 2004/0210353 A1 | 10/2004 | Rice | |
| 2004/0263647 A1 | 12/2004 | Yamaguchi | |
| 2006/0047540 A1 | 3/2006 | Hutten et al. | |
| 2007/0005404 A1 | 1/2007 | Raz et al. | |
| 2007/0027726 A1 | 2/2007 | Warren et al. | |
| 2007/0032929 A1* | 2/2007 | Yoshioka et al. | 701/35 |
| 2008/0065427 A1 | 3/2008 | Helitzer et al. | |
| 2008/0082372 A1 | 4/2008 | Burch | |
| 2008/0167819 A1* | 7/2008 | Breed | 701/300 |
| 2008/0255722 A1 | 10/2008 | McClellan et al. | |
| 2008/0270519 A1* | 10/2008 | Ekdahl et al. | 709/203 |
| 2009/0024419 A1 | 1/2009 | McClellan et al. | |
| 2009/0079555 A1 | 3/2009 | Aguirre De Carcer et al. | |
| 2009/0210257 A1* | 8/2009 | Chalfant et al. | 705/4 |
| 2009/0278933 A1 | 11/2009 | Maeda et al. | |
| 2009/0284361 A1 | 11/2009 | Boddie et al. | |
| 2010/0030582 A1 | 2/2010 | Rippel et al. | |
| 2010/0030586 A1 | 2/2010 | Taylor et al. | |
| 2010/0157061 A1 | 6/2010 | Katsman et al. | |
| 2010/0205012 A1 | 8/2010 | McClellan | |
| 2010/0209884 A1* | 8/2010 | Lin et al. | 434/65 |
| 2010/0238009 A1* | 9/2010 | Cook et al. | 340/439 |
| 2010/0250021 A1* | 9/2010 | Cook et al. | 701/1 |
| 2010/0299021 A1* | 11/2010 | Jalili | 701/35 |
| 2010/0322476 A1* | 12/2010 | Kanhere et al. | 382/103 |
| 2011/0090075 A1 | 4/2011 | Armitage et al. | |
| 2011/0106370 A1 | 5/2011 | Duddle et al. | |
| 2011/0160964 A1* | 6/2011 | Obradovich | 701/41 |
| 2011/0161116 A1* | 6/2011 | Peak et al. | 705/4 |
| 2011/0320492 A1 | 12/2011 | Inghelbrecht | |
| 2012/0066007 A1 | 3/2012 | Ferrick et al. | |
| 2012/0072244 A1* | 3/2012 | Collins et al. | 705/4 |
| 2012/0089423 A1 | 4/2012 | Tamir et al. | |
| 2012/0143493 A1* | 6/2012 | Tang | 701/423 |
| 2012/0194357 A1* | 8/2012 | Ciolli | 340/936 |
| 2013/0096731 A1* | 4/2013 | Tamari et al. | 701/1 |

OTHER PUBLICATIONS

Manitoba Public Insurance, "Moving Toward a Better Driver Rating System" dated 2008.
Chris Tijerina, "How Your Auto Insurance Rates Are Determined", Ezine Articles, date unknown captured May 9, 2012.
Neighborhood Link Website, Your Credit Score Affects Your Auto Insurance Rates, date unknown captured May 9, 2012.
Robin Harbage, "Usage-based Auto Insurance (UBI)" © 2010 Towers Watson.
MyDrive Solutions website, "How does MyDrive work?", date unknown, captured May 9, 2012.
Computer Weekly Website, "How pay-as-you-behave technology could transform car insurance", published Apr. 4, 2011.
Farmers Essential Life ® Universal Life Website; "Universal Life Insurance Designed to Be Flexible to Fit Your Needs", www.farmers.com/universal_life_insurance.html; date unknown, captured May 9, 2012.
Golden State Mutual Life Website; "Introducing Universal Life Insurance", www.gsmlife.com/universal life-Conserv.htm; date unknown, captured May 9, 2012.
Non-Final Office Action for related U.S. Appl. No. 13/770,607 mailed Aug. 7, 2013.
Final Office Action for related U.S. Appl. No. 13/770,607 mailed Dec. 26, 2013.
Non-Final Office Action for related U.S. Appl. No. 13/770,607 mailed May 21, 2014.
Final Office Action for related U.S. Appl. No. 13/770,607 mailed Nov. 18, 2014.
Apr. 3, 2015—(US) Non-Final Office Action—U.S. Appl. No. 13/770,607.
Sep. 24, 2015—(US) Final Office Action—U.S. Appl. No. 13/770,607.
Apr. 21, 2016—(US) Final Office Action—U.S. Appl. No. 13/770,607.
Aug. 12, 2016—(US) Notice of Allowance—U.S. Appl. No. 13/770,607.

* cited by examiner

DRIVING EVENT DATA ANALYSIS

CROSS REFERENCE TO RELATED APPLICATIONS

The present application is a non-provisional of U.S. Provisional Application No. 61/739,456, entitled "Driving Event Data Analysis," filed Dec. 19, 2012, the contents of which are hereby incorporated by reference in their entirety for all purposes.

TECHNICAL FIELD

Aspects of the disclosure generally relate to the analysis of driving data and calculation of driver scores. In particular, various aspects of the disclosure include a framework for evaluating a driving event at a vehicle using image data, video data, and object proximity data from the vehicle and other data sources.

BACKGROUND

Telematics includes the use of technology to communicate information from one location to another. Telematics has been used for various applications, including for the exchange of information with electronic sensors. As telematics technology has progressed, various communication methodologies have been incorporated into automobiles and other types of vehicles.

Telematics systems such as on-board diagnostics (OBD) systems may be used in automobiles and other vehicles. OBD systems may provide information from the vehicle's on-board computers and sensors, allowing users to monitor a wide variety of information relating to the vehicle systems, such as engine RPM, emissions control, coolant temperature, vehicle speed, timing advance, throttle position, and oxygen sensing, and many other types of data. Telematics devices installed within vehicles may be configured to access the vehicle computers and sensor data, and transmit the data to a display within the vehicle, a personal computer or mobile device, or to a centralized data processing system. Data obtained from OBD systems has been used for a variety of purposes, including maintenance, diagnosis, and analysis.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for analyzing vehicle operation data, or driving data, and calculating or adjusting a driver score based on the analyzed driving data. One or more computing devices within a vehicle, for example, a telematics device, may be configured to collect vehicle operational data and transmit the data to a vehicle operation computer system or a driving analysis server. Vehicle operational data may include various data collected by the vehicle's internal sensors, computers, and cameras, such as the vehicle's speed, rates of acceleration, braking, or steering, impacts to the vehicle, usage of vehicle controls, and other vehicle operational data. Based on the vehicle operational data, the driving analysis server may be configured to identify one or more potentially high-risk or unsafe driving events at a vehicle, for example, an occurrence of sudden braking or swerving, an impact to the vehicle, speeding, or a moving violation, etc. Additional image data, video data, and/or object proximity data may be received from one or more data sources in order to analyze the potentially high-risk or unsafe driving event. A driver score may be calculated or adjusted for one or more vehicles or drivers based on the driving event and the analysis of the image, video, or proximity data.

In accordance with further aspects of the present disclosure, the image, video, or proximity data from the vehicle's internal cameras and sensors, internal cameras and sensors of other nearby vehicles, or image and video data from traffic cameras or other data sources may be used to determine one or more causes of the driving event. Data metrics may be calculated based on the image, video, and proximity data, and may be compared to one or more thresholds to determine causes of driving events. For example, a sudden occurrence of swerving or braking, an impact to the vehicle, or a moving violation may be caused by an obstruction in the path of the vehicle, adverse road conditions or weather conditions, poor visibility, an obstructed traffic sign or signal, or an electrical or mechanical malfunction within the vehicle, etc. Additional potential causes of driving events include high-risk or unsafe driving behavior, such as speeding, tailgating, and distracted drivers.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
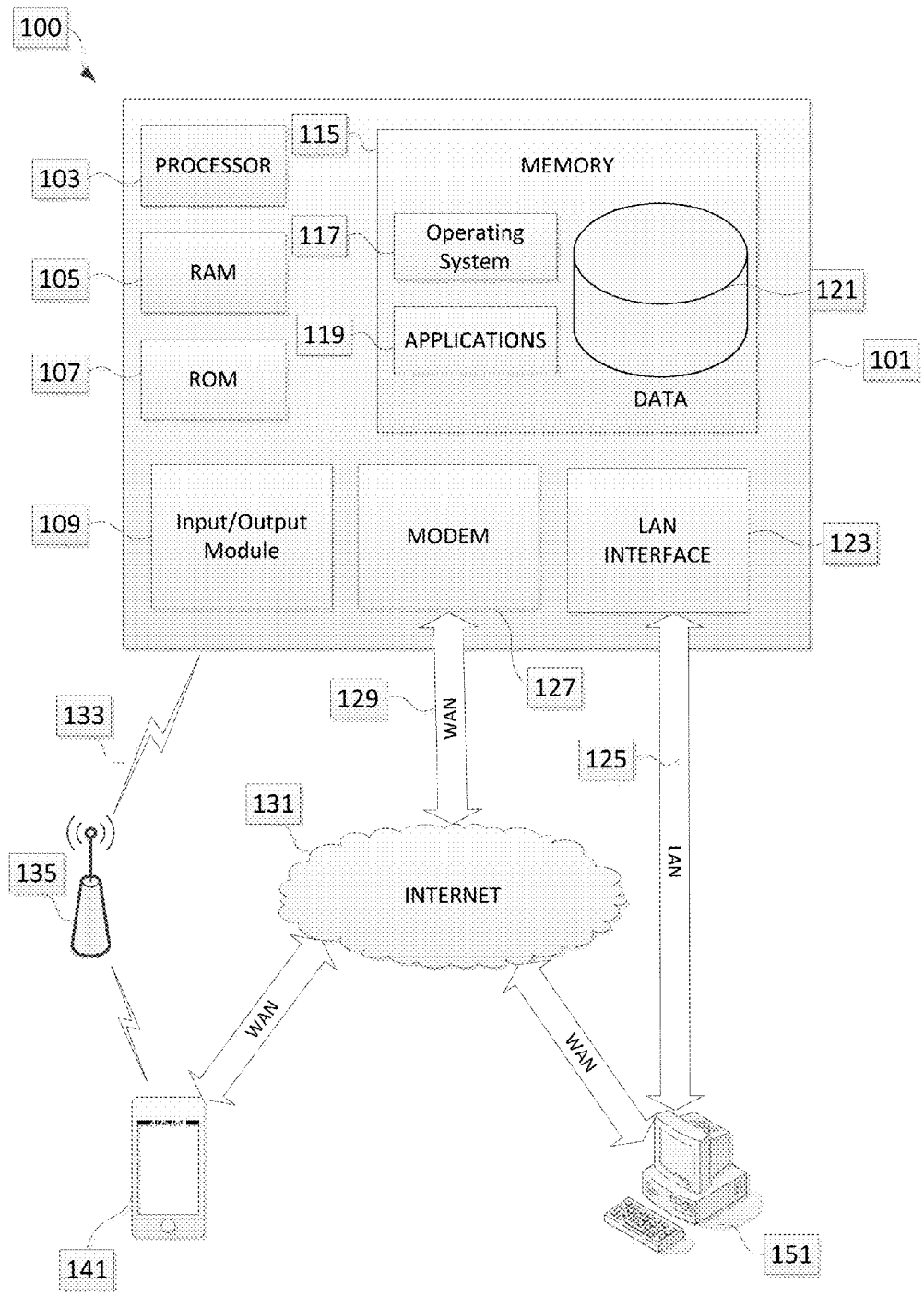
FIG. 1 illustrates a network environment and computing systems that may be used to implement aspects of the disclosure.

FIG. 1 illustrates a block diagram of a computing device (or system) 101 in communication system 100 that may be used according to one or more illustrative embodiments of the disclosure. The device 101 may have a processor 103 for controlling overall operation of the device 101 and its associated components, including RAM 105, ROM 107, input/output module 109, and memory 115. The computing device 101, along with one or more additional devices (e.g., terminals 141, 151) may correspond to any of multiple systems or devices, such as a driving analysis server or system, configured as described herein for receiving and analyzing vehicle driving data and calculating driver scores based on identified driving events.

Input/Output (I/O) 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated internal database 121. Processor 103 and its associated components may allow the driving analysis system 101 to execute a series of computer-readable instructions to receive driving data from a vehicle, identify a driving event based on the driving data, receive image data, video data, and/or object proximity data associated with the driving event, and perform an analysis of the driving event based on image data, video data, and/or object proximity data.

The driving analysis system 101 may operate in a networked environment 100 supporting connections to one or more remote computers, such as terminals 141 and 151. The terminals 141 and 151 may be personal computers, servers (e.g., web servers, database servers), or mobile communication devices (e.g., vehicle telematics devices, on-board vehicle computers, mobile phones, portable computing devices, and the like), and may include some or all of the elements described above with respect to the driving analysis system 101. The network connections depicted in FIG. 1 include a local area network (LAN) 125 and a wide area network (WAN) 129, and a wireless telecommunications network 133, but may also include other networks. When used in a LAN networking environment, the driving analysis system 101 may be connected to the LAN 125 through a network interface or adapter 123. When used in a WAN networking environment, the system 101 may include a modem 127 or other means for establishing communications over the WAN 129, such as network 131 (e.g., the Internet). When used in a wireless telecommunications network 133, the system 101 may include one or more transceivers, digital signal processors, and additional circuitry and software for communicating with wireless computing devices 141 (e.g., mobile phones, vehicle telematics devices) via one or more network devices 135 (e.g., base transceiver stations) in the wireless network 133.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices and driving analysis system components described herein may be configured to communicate using any of these network protocols or technologies.

Additionally, one or more application programs 119 used by the driving analysis server/system 101 may include computer executable instructions (e.g., driving analysis programs and driver score algorithms) for receiving vehicle driving data, identifying driving events, retrieving additional image data, video data, and/or object proximity data associated with the driving events, analyzing the driving events and the additional associated data, performing driving data analyses or driver score computations for one or more vehicles or drivers, and performing other related functions as described herein.

As used herein, a driver score (or driving score) may refer to a measurement of driving abilities, safe driving habits, and other driver information. A driver score may be a rating generated by an insurance company, financial instruction, or other organization, based on the driver's age, vision, medical history, driving record, and/or other account data relating to the driver. For example, an insurance company server 101 may periodically calculate driver scores for one or more of the insurance company's customers, and may use the driver scores to perform insurance analyses and determinations (e.g., determine coverage, calculate premiums and deductibles, award safe driver discounts, etc.). As discussed below, the driver score may be increased or decreased based on the real-time data collected by vehicle sensors, telematics devices, and other systems for measuring driving performance. For example, if a driver consistently drives within posted speed limits, wears a seatbelt, and keeps the vehicle in good repair, the driver score may be positively adjusted (e.g., increased). Alternatively, if a driver regularly speeds, drives aggressively, and does not properly maintain the vehicle, the driver score may be negatively adjusted (e.g., decreased). It should be understood that a driver score, as used herein, may be associated with an individual, group of individuals, or a vehicle. For instance, a family, group of friends or co-workers, or other group that shares a vehicle, may have a single driver score that is shared by the group. Additionally, a vehicle may have an associated driver score that is based on one or more primary drivers of the vehicle and can be affected by the driving behavior of any the vehicle's drivers. In other examples, a vehicle may be configured to identify different drivers, and each driver of the vehicle may have a separate driver score.

Figure 2:
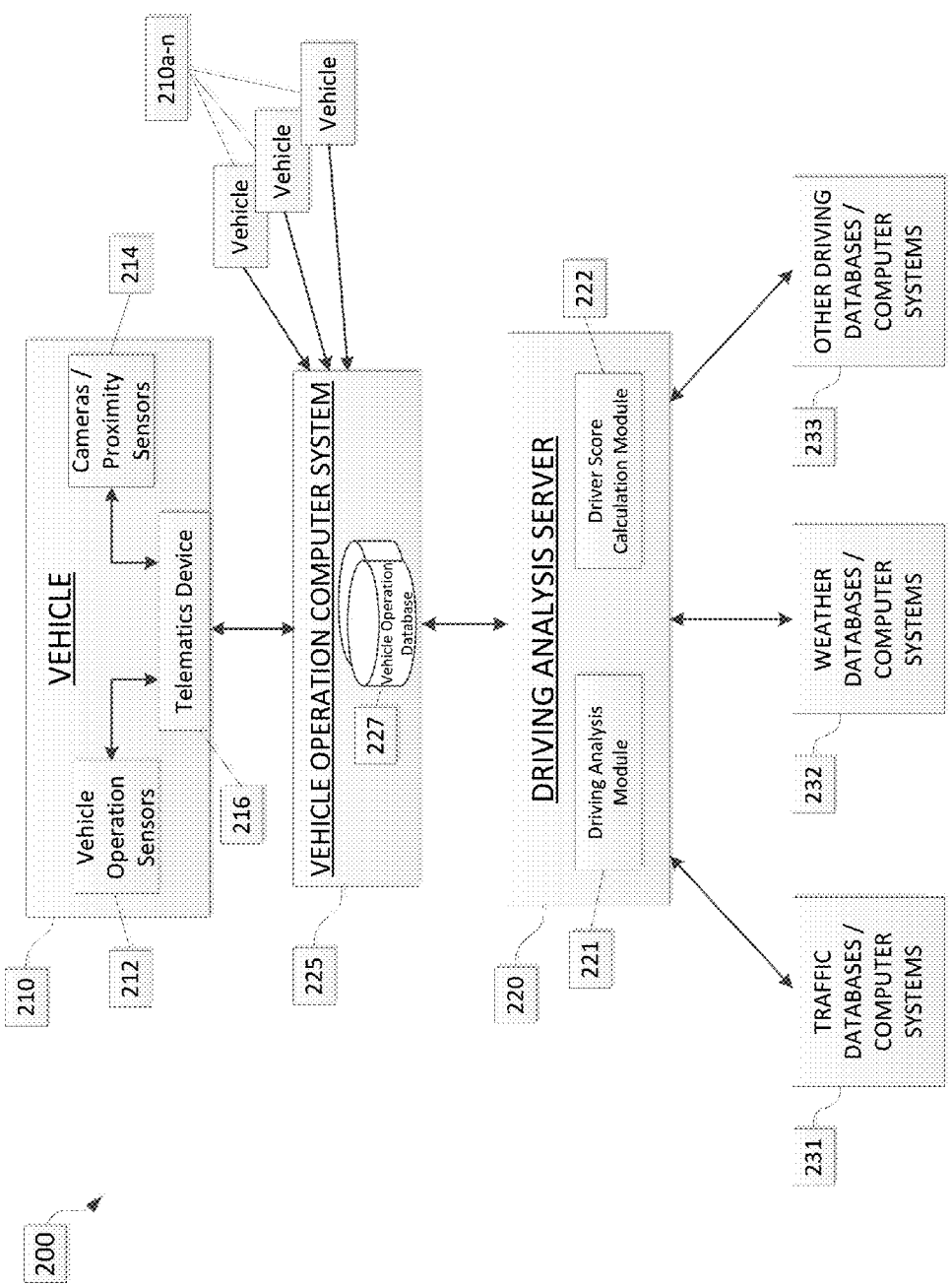
FIG. 2 is a diagram of a driving analysis system, according to one or more aspects of the disclosure.

FIG. 2 is a diagram of an illustrative driving analysis system 200. Each component shown in FIG. 2 may be implemented in hardware, software, or a combination of the two. Additionally, each component of the driving analysis system 200 may include a computing device (or system) having some or all of the structural components described above for computing device 101.

The driving analysis system 200 shown in FIG. 2 includes a vehicle 210, such as an automobile, motorcycle, or other vehicle for which a driving event data analysis may be performed and for which a driver score may be calculated. The vehicle 210 may include vehicle operation sensors 212 capable of detecting and recording various conditions at the vehicle and operational parameters of the vehicle. For example, sensors 212 may detect and store data corresponding to the vehicle's speed, distances driven, rates of acceleration or braking, and specific instances of sudden acceleration, braking, and swerving. Sensors 212 also may detect and store data received from the vehicle's 210 internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 212 may detect and store the external driving conditions, for example, external temperature, rain, snow, light levels, and sun position for driver visibility. Sensors 212 also may detect and store data relating to moving violations and the observance of traffic signals and signs by the vehicle 210. Additional sensors 212 may detect and store data relating to the maintenance of the vehicle 210, such as the engine status, oil level, engine coolant temperature, odometer reading, the level of fuel in the fuel tank, engine revolutions per minute (RPMs), and/or tire pressure.

The vehicle 210 also may include one or more cameras and proximity sensors 214 capable of recording additional conditions inside or outside of the vehicle 210. Internal cameras 214 may detect conditions such as the number of the passengers in the vehicle 210, and potential sources of driver distraction within the vehicle (e.g., pets, phone usage, unsecured objects in the vehicle). External cameras and proximity sensors 214 may detect other nearby vehicles, traffic levels, road conditions, traffic obstructions, animals, cyclists, pedestrians, and other conditions that may factor into a driving event data analysis.

The operational sensors 212 and the cameras and proximity sensors 214 may store data within the vehicle 210, and/or may transmit the data to one or more external computer systems (e.g., a vehicle operation computer system 225 and/or a driving analysis server 220). As shown in FIG. 2, the operation sensors 212, and the cameras and proximity sensors 214, may be configured to transmit data to a vehicle operation computer system 225 via a telematics device 216. In other examples, one or more of the operation sensors 212 and/or the cameras and proximity sensors 214 may be configured to transmit data directly without using a telematics device 216. For example, telematics device 216 may be configured to receive and transmit data from operational sensors 212, while one or more cameras and proximity sensors 214 may be configured to directly transmit data to a vehicle operation computer system 225 or a driving analysis server 220 without using the telematics device 216. Thus, telematics device 216 may be optional in certain embodiments where one or more sensors or cameras 212 and 214 within the vehicle 210 may be configured to independently capture, store, and transmit vehicle operation and driving data.

Telematics device 216 may be a computing device containing many or all of the hardware/software components as the computing device 101 depicted in FIG. 1. As discussed above, the telematics device 216 may receive vehicle operation and driving data from vehicle sensors 212, and proximity sensors and cameras 214, and may transmit the data to one or more external computer systems (e.g., a vehicle operation computer system 225 and/or a driving analysis server 220) over a wireless transmission network. Telematics device 216 also may be configured to detect or determine additional types of data relating to real-time driving and the condition of the vehicle 210. In certain embodiments, the telematics device 216 may contain or may be integral with one or more of the vehicle sensors 212 and proximity sensors and cameras 214 discussed above, and/or with one or more additional sensors discussed below.

Additionally, the telematics device 216 may be configured to collect data regarding the number of passengers and the types of passengers (e.g. adults, children, teenagers, pets, etc.) in the vehicle 210. The telematics device 216 also may be configured to collect data a driver's movements or the condition of a driver. For example, the telematics device 216 may include or communicate with sensors that monitor a driver's movements, such as the driver's eye position and/or head position, etc. Additionally, the telematics device 216 may collect data regarding the physical or mental state of the driver, such as fatigue or intoxication. The condition of the driver may be determined through the movements of the driver or through sensors, for example, sensors that detect the content of alcohol in the air or blood alcohol content of the driver, such as a breathalyzer.

The telematics device 216 also may collect information regarding the driver's route choice, whether the driver follows a given route, and to classify the type of trip (e.g. commute, errand, new route, etc.). In certain embodiments, the telematics device 216 may be configured to communicate with the sensors and/or cameras 212 and 214 to determine when and how often the vehicle 210 stays in a single lane or strays into other lanes. To determine the vehicle's route, lane position, and other data, the telematics device 216 may include or may receive data from a mobile telephone, a Global Positioning System (GPS), locational sensors positioned inside a vehicle, or locational sensors or devices remote from the vehicle 210.

The telematics device 216 also may store the type of the vehicle 210, for example, the make, model, trim (or submodel), year, and/or engine specifications. The vehicle type may be programmed into the telematics device 216 by a user or customer, determined by accessing a remote computer system, such as an insurance company or financial institution server, or may be determined from the vehicle itself (e.g., by accessing the vehicle's 210 computer systems).

Vehicle operation computer system 225 may be a computing device separate from the vehicle 210, containing some or all of the hardware/software components as the computing device 101 depicted in FIG. 1. The vehicle operation computer system 225 may be configured to receive and store the vehicle operation data discussed above from vehicle 210, and similar vehicle operation data from one or more other vehicles 210a-n. In the example shown in FIG. 2, the vehicle operation computer system 225 includes a vehicle operation database 227 that may be configured to store the vehicle operation data collected from the vehicle sensors 212, proximity sensors and cameras 214, and telematics devices 216 of a plurality of vehicles. The vehicle operation database 227 may store operational sensor data, proximity sensor data, camera data (e.g., image, audio, and/or video), location data and/or time data for multiple vehicles 210.

Data stored in the vehicle operation database 227 may be organized in any of several different manners. For example, a table in the vehicle operation database 227 may contain all of the vehicle operation data for a specific vehicle 210, similar to a vehicle event log. Other tables in the vehicle operation database 227 may store certain types of data for multiple vehicles. For instance, tables may store specific driving behaviors (e.g., driving speed, acceleration and braking rates, swerving, tailgating, use of seat belts, turn signals or other vehicle controls, etc.) for multiples vehicles 210 at specific locations, such as specific neighborhoods, roads, or intersections. Vehicle operation data may also be organized by time, so that the driving events or behaviors of multiples vehicles 210 may be stored or grouped by time (e.g., morning, afternoon, late night, rush hour, weekends, etc.) as well as location.

The system 200 also may include a driving analysis server 220, containing some or all of the hardware/software components as the computing device 101 depicted in FIG. 1. The driving analysis server 220 may include hardware, software, and network components to receive vehicle operation data from the vehicle operation computer system 225 and/or directly from a plurality of vehicles 210. The driving analysis server 220 and the vehicle operation computer system 225 may be implemented as a single server/system, or may be separate servers/systems. In some examples, the driving analysis server 220 may be a central server configured to receive vehicle operation data from a plurality of remotely located vehicle operation computer systems 225.

As shown in FIG. 2, driving analysis server 220 may include a driving analysis module 221 and a driver score calculation module 222. Modules 221 and 222 may be implemented in hardware and/or software configured to perform a set of specific functions within the driving analysis server 220. For example, the driving analysis module 221 and the driver score calculation module 222 may include one or more driving event analysis/driver score calculation algorithms, which may be executed by one or more software applications running on generic or specialized hardware within the driving analysis server 220. The driving analysis module 221 may use the vehicle operation data received from the vehicle operation computer system 225 and/or additional image data, video data, and/or object proximity data perform driving event analyses for vehicles 210. The driver score calculation module 222 may use the results of the driving event analysis performed by module 221 to calculate or adjust a driver score for a driver of a vehicle 210 based on specific driving events. Further descriptions and examples of the algorithms, functions, and analyses that may be executed by the driving analysis module 221 and the driver score calculation module 222 are described below in reference to FIGS. 3-5.

To perform driving event analyses and driver score calculations, the driving analysis server 220 may initiate communication with and/or retrieve data from one or more vehicles 210, vehicle operation computer systems 225, and additional computer systems 231-233 storing data that may be relevant to the driving event analyses and driver score calculations. For example, one or more traffic data storage systems 231, such as traffic databases, may store data corresponding to the amount of traffic and certain traffic characteristics (e.g., amount of traffic, average driving speed, traffic speed distribution, and numbers and types of accidents, etc.) at various specific locations and times. Traffic data storage systems 231 also may store image and video data recorded by traffic cameras various specific locations and times. One or more weather data storage systems 232, such as weather databases, may store weather data (e.g., rain, snow, sleet, hail, temperature, wind, road conditions, visibility, etc.) at different locations and different times. One or more additional driving databases/systems 233 may store additional driving data from one or more different data sources or providers which may be relevant to the driving event analyses and/or driver score calculations performed by the driving analysis server 220. Additional driving databases/systems 233 may store data regarding events such as road hazards and traffic accidents, downed trees, power outages, road construction zones, school zones, and natural disasters that may affect the driving event analyses and/or driver score calculations performed by the driving analysis server 220. As discussed below in reference to FIGS. 3-5, the driving analysis server 220 may retrieve and use data from databases/systems 231-233 to analyze and evaluate the driving events identified from the driving data of vehicles 210.

Figure 3:
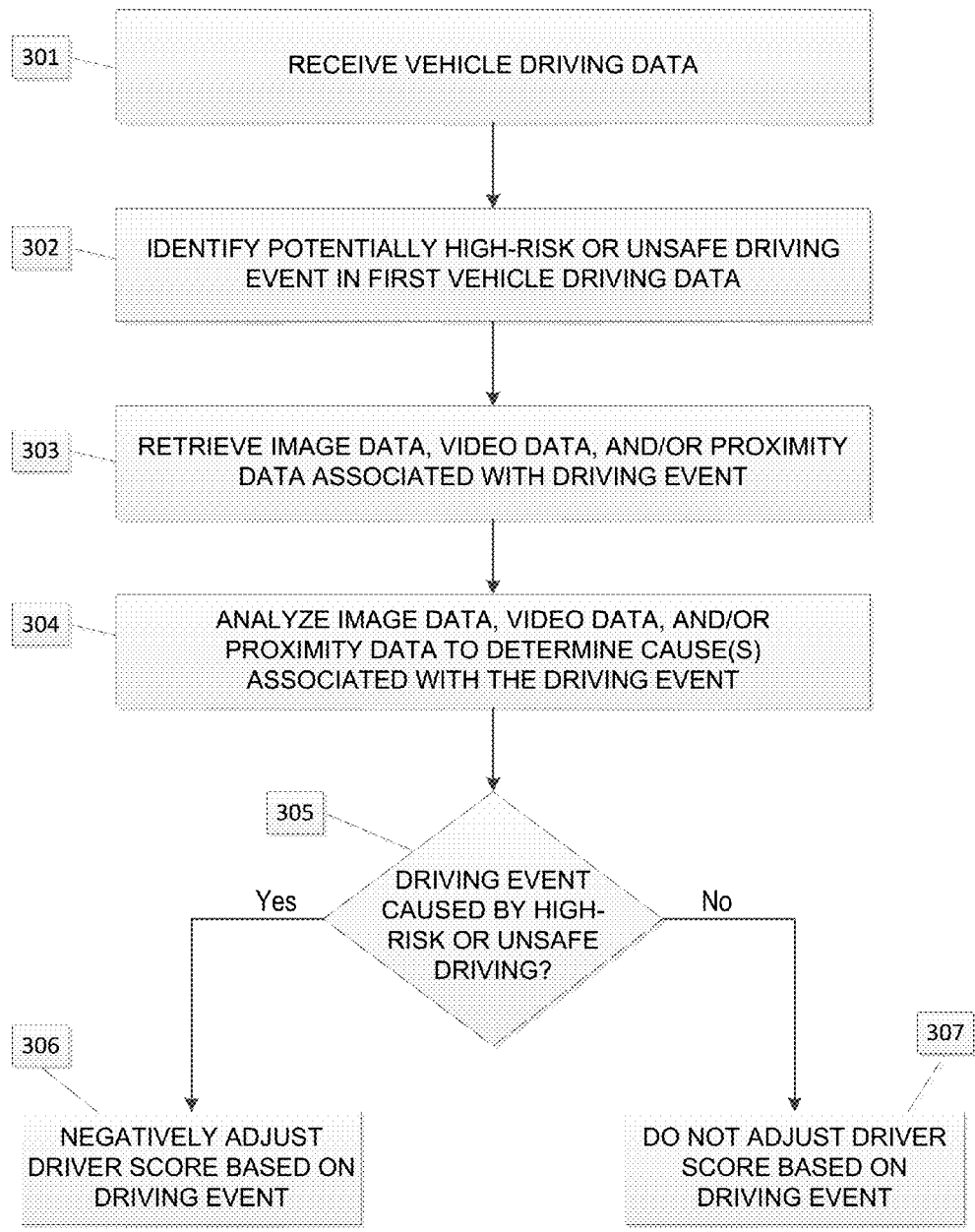
FIG. 3 is a flow diagram illustrating an example method of adjusting a driver score based on a driving event at a vehicle using image data, video data, and/or object proximity data associated with the driving event, according to one or more aspects of the disclosure.

FIG. 3 is a flow diagram illustrating an example method of performing a driving event analysis and adjusting driver score based on a driving event identified for a vehicle, using image data, video data, and/or object proximity data associated with the driving event. This example method may be performed by one or more computing devices (e.g. driving analysis server 220, vehicle operation computer system 225, and vehicle telematics device 216) in the driving analysis system 200.

The steps in the example method of FIG. 3 describe performing an analysis to determine whether or not to adjust a driver score in response to a potentially high-risk or unsafe driving event (e.g., an occurrence of sudden braking or swerving, an impact to the vehicle, or a moving violation, etc.), using image data, video data, and/or object proximity data associated with the driving event. For instance, an occurrence of sudden swerving or braking by a vehicle 210 may indicate a high-risk or unsafe driving behavior by a driver not paying attention to the road and the vehicle's immediate surroundings. However, if the image data, video data, and/or object proximity data shows that a pedestrian, animal, other vehicle, or object quickly and unexpectedly moved into the path of the vehicle 210, then an occurrence of sudden swerving or braking by the vehicle 210 may indicate that the driver of the vehicle 210 was paying proper attention and reacted appropriately to the situation. As another example, speeding or ignoring a posted traffic sign may be considered a potentially high-risk or unsafe driving behavior, and drivers that speed excessively and commit frequent moving violations may receive lower driver scores than other drivers. However, for a vehicle 210 speeding or committing a moving violation, image data, video data, and/or object proximity data may show that there was an external cause for the driving event (e.g., obscured traffic signs, road obstructions, malfunctioning traffic lights, etc.), or may show that a minor speeding offense or moving violation should not be considered high-risk or unsafe driving (e.g., based on road conditions, weather, visibility, etc.).

In step 301, a driving analysis server 220 may receive vehicle operation data (or driving data) for a vehicle 210. As described above in reference to FIG. 2, the driving analysis server 220 may receive vehicle operation data from one or more vehicle operation computer systems 225 and/or directly from telematics devices 216 or other systems on vehicles 210. The vehicle driving data may correspond to sensor data collected by sensors 212 and/or additional data collected by a telematics device 216 or other systems within a vehicle 210. In addition to the vehicle operation data, the driving analysis server 220 may receive location and time information corresponding to the vehicle operation data in step 301. Vehicle location data and time data may be received from the same sources as other vehicle operation data, or may be collected by different data sources or generated by the driving analysis server 220. For example, the driving analysis server 220 may receive vehicle operation data from a vehicle operation system 225, and then may initiate communication with the vehicle's telematics device 216, GPS servers, time servers, or other systems to determine the location and time that correspond to the received vehicle operation data.

In certain embodiments, telematics devices 216, vehicle operation systems 225, and other data sources may transmit vehicle operation data for a vehicle 210 to the driving analysis server 220 in real-time (or near real-time). The driving analysis server 220 may be configured to receive the vehicle operation data, and then perform real-time (or near real-time) driving analyses and driver score calculations for the vehicle 210. In other embodiments, vehicle operation data might not be transmitted in real-time but may be sent periodically (e.g., hourly, daily, weekly, etc.) by telematics devices 216 or vehicle operation systems 225. Periodic transmissions of vehicle operation data may include data for a single vehicle or single driver, or for multiple vehicles or drivers. The driving analysis server 220 may be configured to receive the periodic transmissions, and then to perform periodic driving event analyses and driver score calculations for one or more vehicles and drivers.

In step 302, the driving analysis server 220 may identify one or more potentially high-risk or unsafe driving events (or driving behaviors) within the operation data of the vehicle 210. The driving events identified in step 302 may correspond to specific occurrences or patterns of high-risk, unsafe, or illegal driving activities that have the potential to affect the driver score of the vehicle 210 or a driver of the vehicle 210.

For certain such driving events, the driving analysis server 220 may identify the driving event by analyzing only the vehicle operation data, for example, occurrences of sudden braking, accelerating, or swerving. Other driving events that may be identified based only on the vehicle operation data include failure to use seatbelts, phone usage while driving, loud noise levels inside the vehicle while driving (e.g., high stereo volume or passenger noises), or other distractions in the vehicle (e.g., animated passengers or pets in the vehicle, eating while driving, texting while driving, etc.). Additionally, impacts to the body of the vehicle 210 (e.g., minor accidents, driving fast over speed bumps or dips, etc.) may be identified based only on the operation data received for the vehicle 210.

To identify other types of driving events, the driving analysis server 220 may analyze the vehicle operation data, as well as additional data retrieved from one or more external data sources. For example, to identify an occurrence of speeding by the vehicle 210, the driving analysis server 220 may receive vehicle speed data from a telematics device 216 or vehicle operation system 225, and may receive the vehicle's location from the telematics device 216, vehicle operation system 225, or a separate GPS system associated with the vehicle 210. Then, the driving analysis server 220 may access a speed limit database to determine the legal speed limit at the location of the vehicle 210, and may compare the speed limit to the detected speed of the vehicle.

The driving analysis server 220 may identify other moving violations using similar techniques. For example, the driving analysis server 220 may identify a failure to use proper turn signals by analyzing the turn signal usage of the vehicle 210, as compared to the location/driving route of the vehicle. Stop sign violations, illegal turns, and U-turn violations may be identified by comparing the driving route of the vehicle 210 to a database of the traffic regulations and posted traffic signs at different streets and intersections along the driving route.

Additional driving behaviors that may be identified in step 302 include occurrences of risky or aggressive driving under adverse driving conditions or in safe driving areas. For example, it may be deemed high-risk or unsafe to drive a vehicle 210 at the maximum speed limit during a rainstorm, snowstorm, or on slick or icy road conditions. To detect an occurrence of this type of driving event, the driving analysis server 220 may analyze the speed of the vehicle 210, the speed limit at the vehicle's location, and the weather or road conditions at the time the vehicle was being driven at that location. Additionally, it may be deemed high-risk or unsafe to drive aggressively in safe driving areas, such as construction zones and school zones. To identify an occurrence of aggressive driving in a safe driving area, the driving analysis server 220 may analyze certain vehicle operation data (e.g., sudden acceleration or braking, phone usage while, other driver distractions, etc.), and compare the vehicle's location to a database of safe driving areas.

In step 303, the driving analysis server 220 may retrieve additional image data, video data, and/or object proximity data associated with the driving event(s) identified for the vehicle 210 in step 302. As discussed below, the image, video, and proximity data retrieved in step 303 may allow the driving analysis server 220 to identify external causes and/or justifications for potentially high-risk or unsafe driving events or behaviors. For example, if the driving event identified in step 302 is an occurrence of sudden braking or swerving by the vehicle 210, or an impact to the vehicle 210, then in step 303 the driving analysis server 220 may retrieve image, video, and object proximity data for the time and location of the event in order to determine if there was an external cause for the swerving, braking, or vehicle impact.

The image, video, and object proximity data received by the driving analysis server 220 in step 303 may correspond to various different types of cameras or sensors, and may be received from one or more different data sources. For example, the image, video, and object proximity data may include data recorded by the cameras and proximity sensors 214 of same vehicle 210 at which the driving event was identified in step 302. The data received in step 303 also may include data recorded by cameras and proximity sensors 214 in one or more other vehicles 210*a-n* that were in the immediate proximity of the vehicle 210 at the time of driving event. Additionally, the data received in step 303 may include image, video, and proximity data from other data sources, such traffic camera data received from one or more traffic databases/systems 231.

In certain embodiments, the driving analysis server 220 may identify a potentially high-risk or unsafe driving event of the vehicle 210 in real-time or near real-time (in step 302), and may retrieve image, video, or object proximity data associated with the driving event or near the same time (in step 303). For example, after identifying a potentially high-risk or unsafe driving event at the vehicle 210, one or more of the telematics devices 216 of the vehicle, the vehicle operation system 225, or the driving analysis server 220 may be used to identify the cameras and proximity sensors 214 of the vehicle 212 or other nearby vehicles 210*a-n*, or images and video feeds from traffic cameras in the vicinity of the vehicle 210 at the time of the identified driving event. GPS systems or proximity sensors within the vehicle 210 and/or vehicle location data from other sources may be used to identify traffic cameras or other data sources for image, video, and object proximity data in the vicinity of the vehicle 210 at the time of the driving event. Alternatively, the cameras or proximity sensors near the vehicle 210 at the time of the driving event may be identified at a later time, based on previously stored location data (e.g., GPS coordinates, driving route data) and time data for the vehicle 210, one or more other vehicles 210*a-n*, and traffic cameras and other data sources 231.

In some instances, the driving analysis server 220 may already have, or may already be configured to receive, the associated image data, vehicle data, and object proximity data from the vehicle cameras and proximity sensors 214 of the vehicle 210. For example, the driving analysis server 220 may receive a stream or batch of vehicle operation data from one or more vehicles 210*a-n* or vehicle operation systems 225 containing all of the data recorded by all vehicle operation sensors 212, including the cameras and proximity sensors 214, in the set of vehicles 210*a-n*. Thus, the driving analysis server 220 may receive the associated image, video, and proximity data for a vehicle 210 at the time same that it receives the speed, braking, acceleration, and steering data, and other sensor data from which it may identify a driving event. In other instances, the driving analysis server 220 may specifically request image, video, or object proximity data from the vehicle operation system 225, vehicle telematics devices 216, or other data sources corresponding to the time and location of the driving event, in response to identifying the driving event for the vehicle 210. Thus, the driving analysis server 220 may be configured to locate, initiate communication with, and request specific sensor/camera data from vehicle operation systems 225, vehicle telematics devices 216, and/or traffic camera data sources 231 corresponding to the time and location of the driving event.

As an example, if the driving event identified in step 302 is an impact to the front of a first vehicle 210, then the driving analysis server 220 may be configured to specifically request and retrieve image, video, and object proximity data from the front-facing cameras and sensors 214 of first vehicle 210. Additionally, the driving analysis server 220 may use the location and time data associated with the driving event to identify one or more other vehicles 210*a-n* in the vicinity of the first vehicle 210 at the time of the driving event. For instance, the driving analysis server 220 may access GPS system data, location and time data from telematics devices 216, or location and time data from vehicle operation systems 225 for a plurality of other vehicles. After identifying one or more other vehicles 210*a-n* near the first vehicle 210 at the time of the driving event, the driving analysis server 220 may request and retrieve image, video, and object proximity data from the relevant cameras and sensors 214 of those vehicles. For instance, data from rear-facing cameras and proximity sensors may be requested from vehicles that were in front of the first vehicle 210 at the time of the driving event, data from front-facing cameras and proximity sensors may be requested from vehicles that were behind the first vehicle 210 at the time of the driving event, etc. The driving analysis server 220 also may use the location and time data associated with the driving event to identify one or more traffic cameras or other traffic data sources that may have recorded image, video, or proximity data in the vicinity of the first vehicle 210 at the time of the driving event (e.g., traffic cameras at the road or intersection where the driving event occurred). The driving analysis server 220 may request and retrieve traffic camera images or video recordings from one or more traffic data sources 231 corresponding to the time and location of the driving event.

Figure 4:
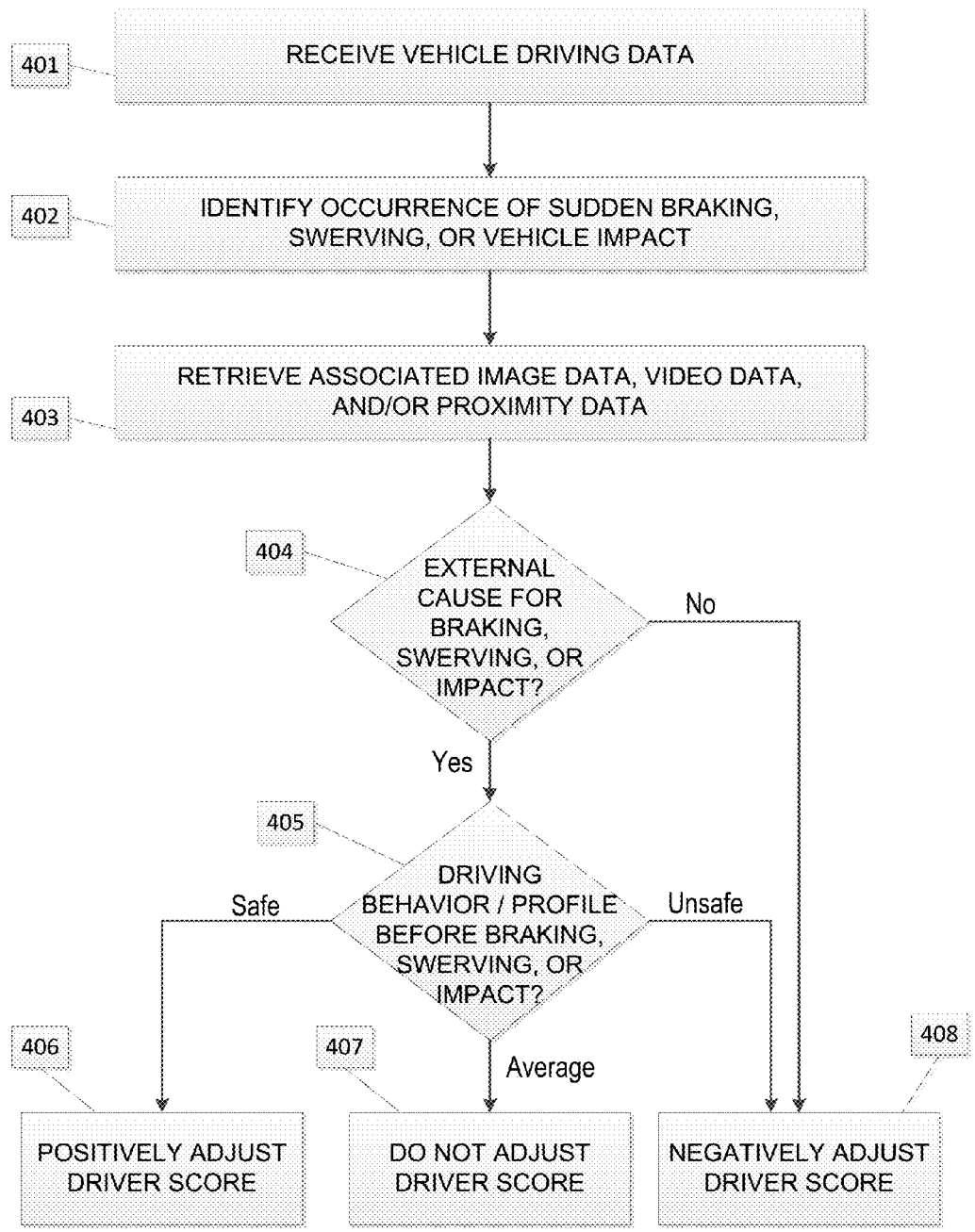
FIG. 4 is a flow diagram illustrating an example method of adjusting a driver score based on an occurrence of sudden braking, swerving, or a vehicle impact, using associated image data, video data, and/or object proximity data, according to one or more aspects of the disclosure.
Figure 5:
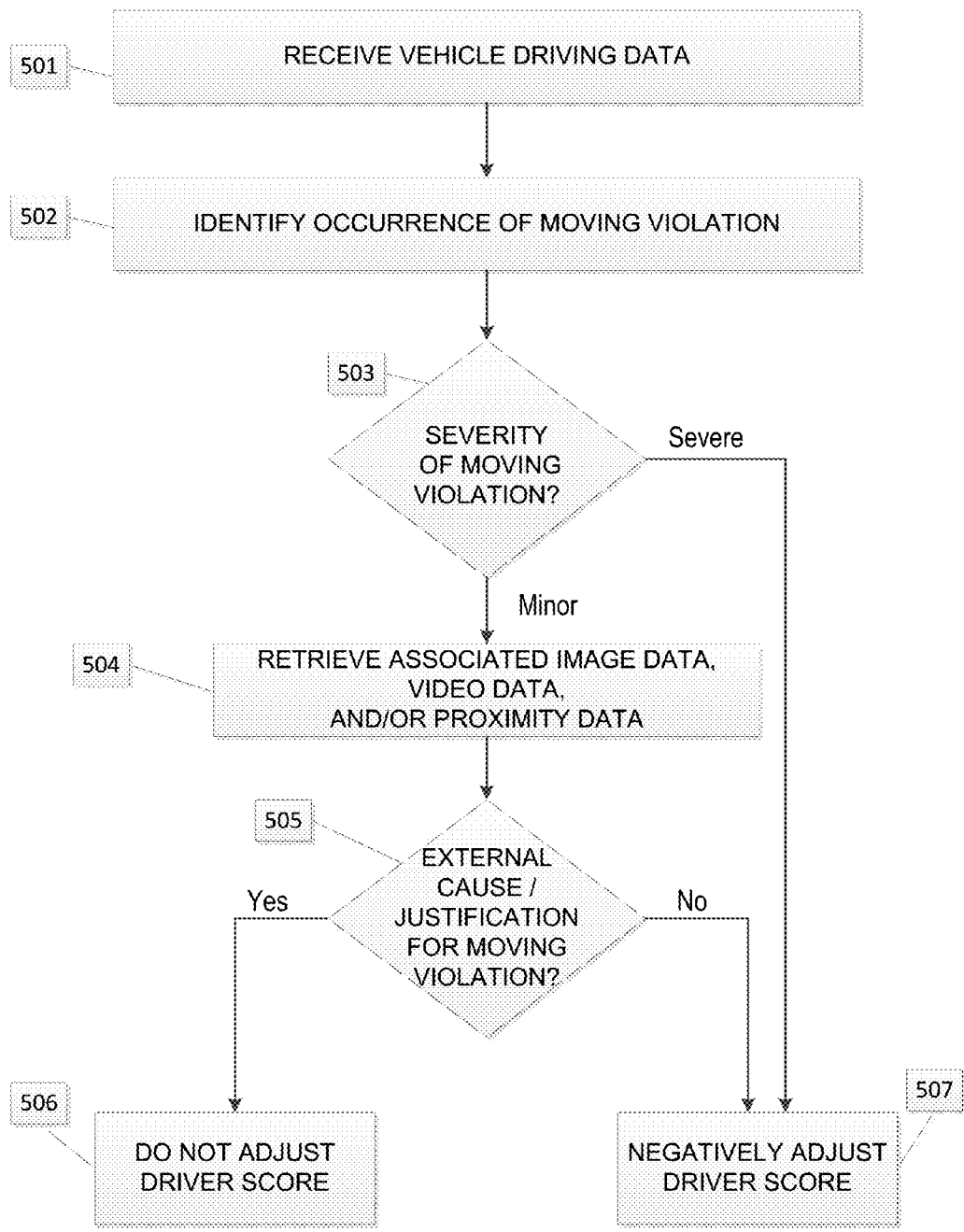
FIG. 5 is a flow diagram illustrating an example method of adjusting a driver score based on an occurrence of a moving violation, using associated image data, video data, and/or object proximity data, according to one or more aspects of the disclosure.

In step 304, the driving analysis server 220 may analyze the image, video, and/or object proximity data retrieved in step 303 to determine one or more causes of the driving event identified in step 302. For example, if the identified driving event is an occurrence of sudden braking or swerving, or an impact to a vehicle 210, then the image, video, and/or object proximity data may be analyzed to determine that the braking, swerving, or impact was caused by one or more of: an obstruction in the path in the vehicle 210; adverse road conditions; an electrical or mechanical malfunction within the vehicle; and/or high-risk or unsafe driving by the driver of the vehicle. As another example, if the identified driving event is an occurrence of speeding or another type of moving violation, then the image, video, and/or object proximity data may be analyzed to determine that the speeding or moving violation was caused by one or more of: a disabled vehicle or other road obstruction, a road construction zone, an obscured or missing traffic sign, and/or a malfunctioning traffic signal. FIGS. 4 and 5, discussed below, respectively describe examples of driving event analyses and determinations of a driver score adjustments based on a braking, swerving, or vehicle impact driving event (FIG. 4), or based on a speeding or moving violation driving event (FIG. 5).

To determine a cause for a driving event in step 304, the driving analysis server 220 may analyze and measure the image, video, and/or proximity data retrieved in step 303, calculate relevant data metrics relating to the event, and compare the data metrics to predetermined thresholds. For example, image, video, and/or proximity data may show that a vehicle 210 swerved to avoid hitting an object that was in the vehicle's path (e.g., a pedestrian, cyclist, animal, disabled vehicle, etc.), and then hit another object (e.g., a tree or a parked car) as a result. In this case, the driving analysis server 220 may analyze the image, video, and/or proximity data to determine the distance between the object and the vehicle when the object entered the vehicle's path, or the distance at which the object was first visible to the driver of the vehicle 210. From this distance, the driving analysis server 220 may use the vehicle's speed to calculate the amount of time that the driver had to react to the obstruction, and may compare that amount of time to a reaction time threshold. For instance, if the driver had very little time to react to the obstruction (e.g., (0-2 seconds), the driving analysis server 220 may determine that the obstruction was the cause of the swerving/accident event, rather than any unsafe or high-risk driving on the part of the driver. On the other hand, if the driver had ample time (e.g., 5-10 seconds) to observe and avoid the obstruction, but only swerved at the last second (hitting the parked car or tree), the driving analysis server 220 may determine that the obstruction was not the cause of the swerving/accident event.

In addition to calculating a reaction time data metric and comparing it to a reaction time threshold, as described in the example above, the driving analysis server 220 may calculate and use additional data metrics and thresholds for determining the causes of driving events. As another example, after an accident between two vehicles, the driving analysis server 220 may use the image, video, and/or proximity data to determine the following distance of the trailing vehicle just before the accident. Based on the following distance, the driving analysis server 220 may use the speed of the vehicles to calculate a tailgating time metric for the trailing vehicle, which may be compared to a tailgating safety threshold (e.g., 2 seconds) to determine whether or not tailgating by the trailing vehicle will be classified as a cause of the accident. Additional data metrics relating to weather conditions, road conditions, and visibility may be calculated using image data and video data received in step 303, and may be used in combination with other data metrics to determine causes of driving events. For instance, a first tailgating safety threshold (e.g., 2 seconds) may be applied in good weather and high visibility conditions, while a second tailgating safety threshold (e.g., 5 seconds) may be applied in poor weather and low visibility conditions such as rain, fog, icy roads, etc. After a traffic accident, if the analysis of the image, video, and proximity data indicates that the trailing vehicle was tailgating closer than the tailgating safety threshold for the current road/weather/visibility conditions, then the driving analysis server 220 may determine that tailgating by the trailing vehicle was a cause of the accident.

As another example, a first speeding safety threshold (e.g., 10 MPH over the posted speed limit), a first turn signal safety threshold (e.g., 100 feet before turning), and/or a first braking safety threshold (e.g., 80% of maximum braking pressure) may be applied for daytime driving on good road conditions, while a second speeding safety threshold (e.g., 5 MPH under the posted speed limit), a second turn signal safety threshold (e.g., 250 feet before turning), and/or a second braking safety threshold (e.g., 40% of the maximum braking pressure) may be applied for specific roads/locations or specific ranges of adverse road conditions (e.g., low visibility ranges, poor road traction ranges, etc.). In addition to these examples, other types of safe/unsafe driving thresholds (e.g., vehicle speed thresholds, vehicle maintenance/operational condition thresholds, tailgating thresholds, lane change thresholds, lane departure thresholds, reaction time thresholds, weather condition thresholds, road condition thresholds, traffic condition thresholds, road visibility thresholds, and thresholds relating to the driver distractions and the use of vehicle controls, etc.) may be used in the analyses of step 304.

The determination in step 304 may identify a single cause or multiple causes for a driving event. As illustrated in the examples above, a driving event such as a sudden occurrence of swerving or braking, or an impact to the vehicle, may have multiple causes. Additionally, a moving violation may have multiple possible causes, for example, a traffic sign that is blocked by an obstruction, bad road conditions, a road construction project, and/or an impatient or high-risk driver. Thus, the driving analysis server 220 may identify multiple causes for a driving event in step 304. In certain examples, the driving analysis server 220 may use the calculated driving metrics and thresholds to calculate ranks and/or percentages associated with one or more determined causes of a driving event. For instance, a traffic accident between two vehicles may be determined by the driving analysis server 220 to have been 30% caused by tailgating by the trailing vehicle, 15% caused by unexpectedly slick road conditions, 5% caused by old and worn brake pads in the trailing vehicle 210, and 50% caused by a sudden occurrence of jaywalking by a pedestrian in front of the leading vehicle.

In step 305, the driving analysis server 220 may determine if the cause (or one of the causes) of the driving event identified in step 302 was high-risk or unsafe driving by the driver of the vehicle 210. In this example, if high-risk or unsafe driving by the driver of the vehicle 210 was a cause of the driving event (305: Yes), then the driving analysis server 220 may negatively adjust a driver score associated with the vehicle 210 or a driver of the vehicle 210 in step 306. On the other hand, if high-risk or unsafe driving by the driver of the vehicle 210 was not a cause of the driving event (306: No), then the driving analysis server 220 might not adjust the driver score associated with the vehicle 210 or driver in step 307.

As discussed above, the analysis in step 304 may determine a single cause or multiple causes for a driving event, and may calculate ranks or percentages associated with each determined cause. Thus, the determination performed by the driving analysis server 220 in step 305 may take into account each of determined causes and the associated ranks or percentages, in deciding whether or not to adjust a driver score and by how much. For example, the driving analysis server 220 may negatively adjust a driver score only if unsafe or high-risk driving was a primary cause of the driving event, or was greater than a predetermined event cause threshold (e.g., >30% cause, >40% cause, >50% cause, etc.). In the case of a driving event affecting two vehicles 210a and 210b, the driving analysis server 220 may receive and analyze the data as described above, and then may adjust a driver score associated with one or both of the vehicles 210a and 210b. For example, an analysis of the image, video, and proximity data for an accident between a first vehicle 210a and a second vehicle 210b may show that the accident was caused partially by erratic and distracted driving by the first driver in vehicles 210a, and partially by tailgating too closely by the second driver in vehicle 210b, resulting in vehicle 210b rear-ending vehicle 210a. In this case, the driving event may be analyzed and driver scores for both vehicles may be adjusted accordingly.

Although the example of FIG. 3 shows a negative driver score adjustment (step 306), in other examples a driver score may be positively adjusted based on the image, video, and proximity data analysis associated with the driving event. For instance, if an image, video, and proximity data analysis in step 304 indicates that a driver was not speeding or tailgating based on the current road conditions, and that the driver reacted quickly and appropriately to an unforeseen driving event (e.g., by quickly swerving or braking to avoid a pedestrian), then the driver score may be positively adjusted (e.g., raised) based on the driving event. Both positive and negative driver score adjustments may be made in varying degrees/magnitudes based on the image, video, and proximity data analysis in step 304. For instance, the driver scores for vehicles/drivers performing in an exceptionally competent and safe manner may be positively adjusted by a greater amount, and vice versa. The magnitude of the driver score adjustments may be based on the magnitude of the data metrics calculated (e.g., speed of driver reaction time, degree of tailgating, degree of speeding, degree of poor driving conditions, degree of low visibility, degree of driver distractions, etc.), and may be determined using additional threshold comparisons in step 304.

In the above examples, the identification of driving events (steps 301-302), retrieval of image, video, and proximity data (step 303), driving event analyses (step 304), and driver score determinations (steps 305-307), may be performed by a driving analysis server 220 external to the vehicle 210. In other examples, a driving analysis server 220 (or other devices) may be located partially or entirely within a vehicle 210 and may be configured to perform some or all of the same steps described above in steps 301-307. For instance, one or more devices within the vehicle 210 (e.g., a telematics device 216 or a driver's mobile device) may be configured as a driving analysis server 220. In certain examples, a driving analysis server 220 within the vehicle 210 may be configured to report the driving event to a vehicle operation system 225 or other external system (e.g., an insurance company computer system) only if a determined cause of the driving event was high-risk or unsafe driving, but not if the determined causes of the driving event were something other than high-risk or unsafe driving.

Referring now to FIGS. 4 and 5, two examples are shown of driving event analyses and determinations of a driver scores based on an occurrence of braking, swerving, or a vehicle impact (FIG. 4), or based on a moving violation (FIG. 5). As illustrated in these examples, there may be differences in the types of image, video, or object proximity data received, the data analyses performed, driving event causes identified, and the driver score adjustments determined, based on the specific type of driving event and the specific circumstances and data available for each driving event.

Referring to FIG. 4, in step 401 a driving analysis server 220 may receive vehicle operation data (or driving data) for a vehicle 210, for example, from a data telematics device 216 or a vehicle operation computer system 225, using various techniques as described above in reference to step 301. In step 402, the driving analysis server 220 may analyze the received vehicle operation data and may identify an occurrence of a sudden swerving, sudden braking, or vehicle impact event by the vehicle 210, using various techniques as described above in reference to step 302. The driving analysis server 220 also may determine the time and location of driving event. In step 403, the driving analysis server 220 may retrieve image data, video data, and/or proximity data associated with the sudden swerving, sudden braking, or vehicle impact by the vehicle 210. For example, the driving analysis server 220 may use the time and location of the driving event, and may request and retrieve the associated data from one or more data sources, such as the appropriate cameras and proximity sensors 214 of the vehicle 210, other cameras and proximity sensors 214 in one or more additional vehicles 210a-201n, and/or images and video from traffic cameras and other traffic data sources 231 corresponding to the time and location of the driving event, as described above in reference to step 303.

In step 404, the driving analysis server 220 may analyze the retrieved image, video, and/or proximity data and may attempt to identify an external cause for the sudden swerving, sudden braking, or vehicle impact by the vehicle 210. For example, an image or video analysis by the driving analysis server 220 of the front-facing camera data of the vehicle 210, or other image or video data, may indicate that a pedestrian, animal, cyclist, disabled vehicle, or other obstruction was an external cause of the sudden swerving, braking, or impact by the vehicle 210. If an external cause cannot be identified (404: No), then the driver's score in this example may be negatively adjusted in step 408, using various techniques as described above in reference to step 306. If an external cause for the sudden swerving, sudden braking, or vehicle impact can be identified (404: Yes), then the driving analysis server 220 may retrieve and analyze additional data in step 405 to determine the driving behavior and driving profile of the driver/vehicle prior to the swerving, braking, or impact. Thus, in step 405, additional image, video, and/or proximity data, along with other types of data from various data sources, may be retrieved to determine if the driver/vehicle was driving in a competent and safe manner prior to the occurrence of the swerving, braking, or impact to the vehicle. For instance, the driving analysis server 220 may determine in step 405 if the vehicle 210 was tailgating (using one or more tailgating thresholds), speeding (using one or more speed thresholds), driving impatiently or recklessly (using one or more braking and acceleration rate thresholds, lane change or lane departure thresholds, etc.), or driving while distracted (using one or more reaction time thresholds, noise threshold, and/or driver distraction thresholds, etc.), and so on. The analysis in step 405 also may be based on a driver profile for the vehicle 210 or a driver of the vehicle 210. Driver profiles may be calculated and stored, for example, by an insurance company, financial institution, or other organization, using a driver's age, driving record, and the driver's previous scores and behaviors associated with previous driving events.

If the driving analysis server 220 determines, based on the previous driving behavior and driver profile, that the vehicle was being driven safely prior to and during the swerving, braking, or impact to the vehicle (405: Safe), then the driver's score may be positively adjusted in step 406. On the other hand, if the driving analysis server 220 determines, based on the previous driving behavior and driver profile, that the vehicle was not being driven safely prior to and during the swerving, braking, or vehicle impact (405: Unsafe), then the driver's score may be negatively adjusted in step 408. If the driving analysis server 220 determines, based on the previous driving behavior and driver profile, that the vehicle was being driven within an average range of safe driving behavior prior to and during the swerving, braking, or vehicle impact (405: Average), then the driver's score might not be adjusted positively or negatively in this example (step 407).

Referring now to FIG. 5, in step 501, a driving analysis server 220 may receive vehicle operation data (or driving data) for a vehicle 210, using various techniques as described above in reference to steps 301 and 401. In step 502, the driving analysis server 220 may analyze the received vehicle operation data and identify an occurrence of a moving violation (e.g., speeding, a stop sign violation, an illegal turn, a U-turn violation, or a failure to use turn signals or required other vehicle controls, etc.), using various techniques as described above in reference to step 302. For example, the driving analysis server 220 may identify a failure to use proper turn signals by analyzing the turn signal usage of the vehicle 210, as compared to the location/driving route of the vehicle. Speeding, stop sign violations, illegal turns, and U-turn violations may be identified by comparing the driving route of the vehicle 210 to a database of the traffic regulations and posted traffic signs at different roads and intersections along the driving route. The driving analysis server 220 also may determine the time and location of driving event identified in step 502.

In step 503, the driving analysis server 220 may analyze the vehicle operation data to determine a level of severity of the speeding or moving violation. To determine a level of severity, the driving analysis server 220 may compare the vehicle operation data to one or more severity thresholds for speeding or moving violations. For example, a speeding severity threshold of 10 MPH over the speed limit may be applied to classify occurrences of speeding between 0-10 MPH over the speed limit as "Minor" and occurrences of speeding greater than or equal to 10 MPH over the speed limit as "Severe." As another example, a moving violation for failing to come to a complete stop at a stop sign may have a severity threshold corresponding to the vehicle's speed when passing the stop sign (e.g., "Minor"=less than 5 MPH, "Severe"=greater than 5 MPH). Additional severity thresholds may be stored and used by the driving analysis server 220 for additional types of moving violations. In certain cases, the severity thresholds for moving violations may related to the number of times or frequency that a vehicle commits the moving violation. For example, one instance of failing to use a turn signal when turning or changing lanes may be considered a "Minor" violation, while repeatedly failing to do so (e.g., greater than 5 times in one trip, greater than 25% of the time, etc.) may be classified as a "Severe" turn signal violation.

If the moving violation(s) identified in step 502 are determined to be "Severe" in step 503 (503: Severe), then driving analysis server 220 may negatively adjust the driver's score in step 507. Thus, the driving analysis server 220 in this example may adjust the driver's score based on "Severe" occurrence of speeding or a moving violation, without retrieving or analyzing any image data, video data, and/or proximity data associated with the speeding or moving violation. In other examples, image data, video data, and/or proximity data may be received and analyzed in all cases. Additionally, rather than classifying occurrences moving violations into only two categories, many different categories may be defined corresponding to the severity/magnitude, frequency, and external conditions (e.g., weather, road conditions, driver distractions) associated with the moving violation. In such cases, the different categories of severity may be processed differently by the driving analysis server 220, for instance, using different magnitudes of adjustments to the driver's score in step 507, or by retrieving and analyzing different sets of image, video, and/or proximity data using different algorithms, as described in the examples above.

In this example, if the moving violation(s) identified in step 502 are determined to be "Minor" in step 503 (503: Minor), then driving analysis server 220 retrieve image data, video data, and/or proximity data associated with the moving violation event by the vehicle 210. For instance, the driving analysis server 220 may use the time and location of the driving event, and may request and retrieve the associated data from one or more data sources, such as the appropriate cameras and proximity sensors 214 of the vehicle 210, other cameras and proximity sensors 214 in one or more additional vehicles 210a-201n, and/or images and video from traffic cameras and other traffic data sources 231 corresponding to the time and location of the driving event, as described above in reference to steps 303 and 403.

In step 505, the driving analysis server 220 may analyze the image, video, and/or proximity data retrieved in step 504 to determine whether or not there was an external cause or a justification for the moving violation. For example, analysis of the image, video, and/or proximity data by the driving analysis server 220 may indicate that a moving violation was caused by an obstruction (e.g., disabled vehicle, road construction zone, or other obstruction) that required the vehicle 210 to drive on the opposite side of the road or perform a driving maneuver that would normally be considered a traffic violation. Additionally, if an analysis of the image or video data shows that a traffic sign is missing or obscured (e.g., by a tree, service vehicle, or other sign), or if a traffic signal is malfunctioning, then the driving analysis server 220 may determine that the ineffective traffic sign or signal was an external cause of the vehicle's 210 moving violation.

The driving analysis server 220 also may determine in step 505 when a minor occurrence of speeding or another moving violation is not actually unsafe or high-risk driving, and thus might not be deserving of a negative adjustment to the driver's score. To determine whether or not a minor moving violation is justified (i.e., not unsafe or high-risk), the driving analysis server 220 may analyze the image, video, and/or proximity data retrieved in step 504, along with any other available data to evaluate the driving conditions and circumstances of the moving violation. For example, if the minor moving violation took place in good weather conditions, good road conditions, high visibility, and low traffic conditions, then the driving analysis server 220 may determine that that a minor occurrence of speeding or another moving violation was not unsafe or high-risk (505: Yes), and might not negatively adjust the driver's score as a result of the violation. In order to make the determination in step 505, data metrics relating to weather conditions, road conditions, and visibility may be calculated using image data and video data received in step 504, and/or data from additional data sources (e.g., traffic databases 231, weather databases 232, etc.) The calculated data metrics for weather conditions, road conditions, visibility, traffic, etc., may be compared to one or more predetermined thresholds for safe driving conditions, for example, a minimum safe road conditions threshold, a minimum safe visibility threshold, a maximum safe traffic threshold, to determine whether the minor moving violation took place in sufficiently safe driving conditions to classify the violation as not unsafe or high-risk. On the other hand, if the minor violation did not take place in good weather conditions, good road conditions, high visibility, or low traffic conditions, then the driving analysis server 220 may determine that that the minor speeding or moving violation was unsafe or high-risk (505: No), and may negatively adjust the driver's score in step 507 as a result of the violation.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

The invention claimed is:

1. A driving analysis system comprising a first vehicle on-board data recording system and a driving analysis server:

wherein the first vehicle on-board data recording system comprises:
    one or more vehicle operation sensors configured to record vehicle operation data at a first vehicle;
    one or more cameras or object proximity sensors configured to record image, video, or proximity data at the first vehicle; and
    one or more telematics devices configured to transmit the vehicle operation data and the image, video, or proximity data from the first vehicle to the driving analysis server,
  wherein the driving analysis server comprises a processor and a memory unit storing computer-executable instructions, which when executed by the processor, cause the driving analysis server to:
    receive a driver score associated with a driver of the first vehicle;
    receive first vehicle operation data from the first vehicle on-board data recording system;
    identify a first driving event of the first vehicle based on the first vehicle operation data;
    receive at least one of image data, video data, and proximity data from the first vehicle on-board data recording system corresponding to the first driving event;

identify at least a first cause of the first driving event and a second cause of the first driving event, wherein identifying the at least a first cause and a second cause comprises:
  attempting to identify at least two external causes of the first driving event by analyzing at least one of the image data, video data, or object proximity data received from the first vehicle on-board data recording system corresponding to the first driving event;
  if at least two external causes can be identified:
    identifying a first external cause and a second external cause;
    based on the analysis of the at least one of image data, video data, or object proximity data corresponding to the first driving event, determining a percentage of cause associated with each of the first external cause and the second external cause;
    evaluating the determined percentage of cause of the first external cause and the second external cause to identify one of the first external cause and the second external cause as a primary cause, the primary cause being the cause having a percentage greater than a predetermined event cause threshold;
    determining whether the primary cause was unsafe or high-risk driving;
    responsive to determining that the primary cause was unsafe or high-risk driving, adjusting the driver score;
    responsive to determining that the primary cause was not unsafe or high-risk driving, maintaining the driver score based on the first driving event; and
  if at least two external causes cannot be identified, determining that high-risk or unsafe driving by the driver of the first vehicle was the cause of the first driving event and adjusting the driver score based on the at least two external causes not being identified; and
  output at least the first cause of the first driving event.

2. The driving analysis system of claim 1, wherein identifying the first driving event comprises:
analyzing the first vehicle operation data to identify an occurrence of sudden braking by the first vehicle or an occurrence of swerving by the first vehicle.

3. A driving analysis system comprising a first vehicle on-board data recording system, an external image, video, or proximity data source, and a driving analysis server:
  wherein the first vehicle on-board data recording system comprises:
    one or more vehicle operation sensors configured to record vehicle operation data at a first vehicle; and
    one or more telematics devices configured to transmit the vehicle operation data to the driving analysis server,
  wherein the external image, video, or proximity data source comprises:
    one or more cameras or object proximity sensors configured to record image, video, or proximity data, wherein the cameras or object proximity sensors are separate from the first vehicle; and
    one or more transmitters or network interfaces configured to transmit image, video, or proximity data to the driving analysis server,
  wherein the driving analysis server comprises a processor and a memory unit storing computer-executable instructions, which when executed by the processor, cause the driving analysis server to:
    receive a driver score associated with a driver of the first vehicle;
    receive first vehicle operation data from the first vehicle on-board data recording system;
    identify a first driving event of the first vehicle based on the first vehicle operation data;
    identify a first location and time associated with the first driving event;
    retrieve data from the external image, video, or proximity data source, corresponding to the first location and time associated with the first driving event;
    identify at least a first cause of the first driving event and a second cause of the first driving event, wherein identifying the first cause and the second cause comprises:
      attempting to identify at least two external causes of the first driving event by analyzing data retrieved from the external image, video, or proximity data source corresponding to the first location and time associated with the first driving event;
      if at least two external causes can be identified:
        identifying a first external cause and a second external cause;
        based on the analysis of the data retrieved from the external image, video, or proximity data source corresponding to the first location and time associated with the first driving event, determining a percentage of cause associated with each of the first external cause and the second external cause;
        evaluating the determined percentage of cause of the first external cause and the second external cause to identify one of the first external cause and the second external cause as a primary cause, the primary cause being the cause having a percentage greater than a predetermined event cause threshold;
        determining whether the primary cause was unsafe or high-risk driving;
        responsive to determining that the primary cause was unsafe or high-risk driving, adjusting the driver score;
        responsive to determining that the primary cause was not unsafe or high-risk driving, maintaining the driver score based on the first cause of the first driving event;
      if at least two external causes cannot be identified, determining that high-risk or unsafe driving by a driver of the first vehicle was the cause of the first driving event and adjusting the driver score based on the at least two external causes not being identified; and
      output at least the first cause of the first driving event.

4. The driving analysis system of claim 3, wherein retrieving data from the external image, video, or proximity data source comprises:
  identifying one or more additional vehicles at locations and times corresponding to the first location and time of the first driving event; and
  retrieving image data, video data, or object proximity data collected by at least one or more vehicle on-board data recording systems of the one or more additional vehicles at locations and times corresponding to the first location and time of the first driving event.

5. The driving analysis system of claim 3, wherein retrieving data from the external image, video, or proximity data source corresponding to the first location and time associated with the first driving event comprises:
   using the first location and time associated with the first driving event, identifying a first external traffic camera in the vicinity of the first vehicle at the time of the first driving event; and
   retrieving image data, video data, or object proximity data from the first external traffic camera.

6. The driving analysis system of claim 1, wherein identifying the first driving event of the first vehicle by the driving analysis server comprises:
   determining an occurrence of a moving violation by the first vehicle, based on the first vehicle operation data.

7. The driving analysis system of claim 6, wherein determining the occurrence of the moving violation comprises:
   receiving moving vehicle regulation data from one or more external data sources, corresponding to the location and time of the first driving event; and
   comparing the first vehicle operation data received from the first vehicle on-board data recording system to the moving vehicle regulation data received from the one or more external data sources.

8. The driving analysis system of claim 1, wherein attempting to identify at least two external causes of the first driving event by the driving analysis server comprises:
   using the location and time of the first driving event, retrieving at least one of traffic data, weather data, or road condition data corresponding to the location and time of the first driving event, from one or more external data sources; and
   analyzing the traffic data, weather data, or road condition data retrieved from the one or more external data sources, along with at least one of the image data, video data, or object proximity data received from the first vehicle on-board data recording system, to attempt to determine at least two external causes of the first driving event.

9. The driving analysis system of claim 1, wherein identifying the first cause of the first driving event comprises:
   using at least one of the image data, video data, or object proximity data received from the first vehicle on-board data recording system to calculate a driver reaction time associated with the first event; and
   determining the at least a first cause of the first driving event based on the driver reaction time associated with the first event.

10. The driving analysis system of claim 1, wherein identifying the at least a first cause of the first driving event comprises:
   using at least one of the image data, video data, or object proximity data received from the first vehicle on-board data recording system to calculate a driver visibility level associated with the first event; and
   determining the at least the first cause of the first driving event based on the driver visibility level associated with the first event.

11. The driving analysis system of claim 1, wherein identifying the at least a first cause of the first driving event comprises:
   using at least one of the image data, video data, or object proximity data received from the first vehicle on-board data recording system to calculate a traffic amount associated with the first event; and
   determining the at least a first cause of the first driving event based on the traffic amount associated with the first event.

12. A driving analysis system comprising an on-board vehicle driving analysis device and a driving analysis server:
   the on-board vehicle driving analysis device comprising a processing unit and a memory unit storing computer-executable instructions, which when executed by the processing unit, cause the on-board vehicle driving analysis device to:
      receive driving data collected by vehicle operation sensors of a first vehicle, wherein the on-board vehicle driving analysis device is located on the first vehicle;
      receive potential moving violation data identifying one or more potential moving violations in the proximity of the first vehicle;
      determine, at the first vehicle, that a moving violation has been committed by the first vehicle, based on the received driving data and the potential moving violation data;
      in response to the determination that a moving violation has been committed by the first vehicle, retrieve and analyze additional data relating to the moving violation; and
      based on the analysis of the additional data relating to the moving violation committed by the first vehicle, determine whether high-risk or unsafe driving was a cause of the moving violation;
      responsive to determining that high-risk or unsafe driving was the cause of the moving violation, transmit a report of the moving violation to the driving analysis server; and
      responsive to determining that high-risk or unsafe driving was not the cause of the moving violation, not transmit a report of the moving violation to the driving analysis server,
   the driving analysis server comprising a processing unit and a memory unit storing computer-executable instructions, which when executed by the processing unit, cause the driving analysis server to:
      receive reports of moving violations from the on-board vehicle driving analysis device on the first vehicle, and one or more additional on-board vehicle driving analysis device on other vehicles.

13. The driving analysis system of claim 12, wherein the potential moving violation data comprises a speed limit at a current location of the first vehicle, and wherein determining that the moving violation has been committed comprises:
   comparing, at the first vehicle, the speed limit at the current location of the first vehicle to a current speed of the first vehicle detected by vehicle operation sensors of the first vehicle; and
   determining, at the first vehicle, that the first vehicle is exceeding the speed limit.

14. The driving analysis system of claim 12, wherein receiving the potential moving violation data comprises:
   determining a first location of the first vehicle; and
   receiving, at the first vehicle, moving vehicle regulation data from one or more external data sources, corresponding to the first location of the first vehicle.

15. The driving analysis system of claim 12, wherein receiving the potential moving violation data comprises:
   using one or more external cameras of the first vehicle, capturing an image of a posted traffic sign in the proximity of the first vehicle; and analyzing the captured image of the posted traffic sign to determine the potential moving violation data.

16. The driving analysis system of claim 12, wherein determining whether high-risk or unsafe driving was the cause of the moving violation further includes:
  identifying a cause of the moving violation committed by the first vehicle, wherein identifying the cause comprises;
    attempting to identify an external cause of the moving violation committed by the first vehicle by analyzing at least one of image data, video data, or object proximity data collected by one or more cameras or object proximity sensors of the first vehicle; and
    if an external cause cannot be identified, determining that high-risk or unsafe driving by a driver of the first vehicle was the cause of the moving violation committed by the first vehicle; and
  transmitting a record of the moving violation committed by the first vehicle to the driving analysis server only if the identified cause corresponds to high-risk or unsafe driving by a driver of the first vehicle,
  wherein if the identified cause of the moving violation committed by the first vehicle corresponds to something other than high-risk or unsafe driving, the on-board vehicle driving analysis device is configured not to transmit a record of the moving violation to the driving analysis server.

17. The driving analysis system of claim 16, wherein determining whether a report of the moving violation should be transmitted to the driving analysis server further comprises:
  determining a level of severity of the moving violation committed by the first vehicle; and
  transmitting a record of the moving violation committed by the first vehicle to the driving analysis server only if the identified cause corresponds to high-risk or unsafe driving by a driver of the first vehicle, and if the determined level severity is greater than a predetermined threshold,
  wherein if the identified cause of the moving violation corresponds to something other than high-risk or unsafe driving, or if the determined level of severity is not greater than the predetermined threshold, the on-board vehicle driving analysis device is configured not to transmit a record of the moving violation to the driving analysis server.

18. The driving analysis system of claim 1, the driving analysis server comprising further computer-executable instructions, which when executed by the processor, cause the driving analysis server to:
  transmit a record of the first driving event to an external insurance system associated with the first vehicle only if the identified at least two causes correspond to high-risk or unsafe driving by a driver of the first vehicle,
  wherein if the at least two identified causes of the first driving event correspond to something other than high-risk or unsafe driving, the driving analysis server is configured not to transmit a record of the first driving event to the external insurance system associated with the first vehicle.

19. The driving analysis system of claim 3, the driving analysis server comprising further computer-executable instructions, which when executed by the processor, cause the driving analysis server to:
  transmit a record of the first driving event to an external insurance system associated with the first vehicle only if the identified at least two causes correspond to high-risk or unsafe driving by a driver of the first vehicle,
  wherein if the at least two identified causes of the first driving event corresponds to something other than high-risk or unsafe driving, the driving analysis server is configured not to transmit a record of the first driving event to the external insurance system associated with the first vehicle.

20. The driving analysis system of claim 12, wherein determining whether a report of the moving violation should be transmitted to the driving analysis server comprises:
  identifying at least one cause of the moving violation committed by the first vehicle;
  determining a level of severity of the moving violation committed by the first vehicle; and
  calculating a total number of moving violations committed by the first vehicle during a period,
  wherein the determination of whether a report of the moving violation should be transmitted to the driving analysis server is based on each of (i) the at least one cause of the moving violation, (ii) the severity level of the moving violation, and (iii) the total number of moving violations committed by the first vehicle during the period.

* * * * *